US006136126A

United States Patent [19]

Fenzi

[11] Patent Number: 6,136,126

[45] Date of Patent: Oct. 24, 2000

[54] PROCESS FOR MAKING DECORATED, EXTRUDED, PROFILED ELEMENTS

[75] Inventor: Giancarlo Fenzi, Cazzano di Tramigna, Italy

[73] Assignee: Verniciatura Industriale Veneta S.p.A., Cazzano di Tramigna VR, Italy

[21] Appl. No.: 08/913,514

[22] PCT Filed: Feb. 15, 1996

[86] PCT No.: PCT/EP96/00656

§ 371 Date: Sep. 15, 1997

§ 102(e) Date: Sep. 15, 1997

[87] PCT Pub. No.: WO96/29208

PCT Pub. Date: Sep. 26, 1996

[30] Foreign Application Priority Data

Mar. 22, 1995 [IT] Italy .................................. MI95A0570

[51] Int. Cl.$^{7}$ .......................... B44C 1/165; B29C 63/20; B32B 5/06; B41M 3/12

[52] U.S. Cl. .......................... 156/230; 156/240; 156/247; 156/285; 156/286; 101/33; 101/34; 428/195; 428/202; 428/204; 428/914

[58] Field of Search .................................... 156/230, 233, 156/234, 235, 238, 239, 240, 241, 244.12, 244.13, 244.26, 244.27, 276, 277, 285, 286, 287, 288, 289, 381, 382, 384, 540, 247; 428/195, 202, 204, 207, 913, 914; 101/33, 34

[56] References Cited

U.S. PATENT DOCUMENTS

| | | | |
|---|---|---|---|
| 3,264,158 | 8/1966 | Howe et al. | 156/230 |
| 3,340,121 | 9/1967 | Lawrenz | 156/233 |
| 3,484,342 | 12/1969 | Blake et al. | 204/18 |
| 3,528,867 | 9/1970 | Leatherman et al. | 156/272 |
| 3,868,901 | 3/1975 | Valiela | 101/141 |
| 4,328,268 | 5/1982 | Tsuji et al. | 428/40 |
| 4,411,667 | 10/1983 | Meredith et al. | 8/471 |
| 4,842,670 | 6/1989 | Callis et al. | 156/282 |
| 5,063,085 | 11/1991 | Yamane et al. | 427/240 |
| 5,242,651 | 9/1993 | Brayden et al. | 264/510 |
| 5,358,778 | 10/1994 | Nagashima et al. | 428/212 |
| 5,641,372 | 6/1997 | Okuno | 156/230 |
| 5,897,739 | 4/1999 | Forster et al. | 156/285 |

FOREIGN PATENT DOCUMENTS

| | | | |
|---|---|---|---|
| 0252610 | 6/1987 | European Pat. Off. . | |
| 0252610A1 | 1/1988 | European Pat. Off. | 156/230 |
| 0 451 067 | 10/1991 | European Pat. Off. . | |
| 0451067 A1 | 10/1991 | European Pat. Off. | B44C 1/16 |
| 0 544 603 | 6/1993 | European Pat. Off. . | |
| 0 606 189 | 7/1994 | European Pat. Off. . | |
| 0 641 575 | 3/1995 | European Pat. Off. . | |
| 2203321 | 5/1974 | France . | |
| 2470007 | 11/1979 | France . | |
| 2597029 | 4/1986 | France . | |
| 3005176 | 2/1979 | Germany . | |

OTHER PUBLICATIONS

CER ERM: "La Decoration des objets par sublimation" Oct. 1992.

*Primary Examiner*—Richard Crispino
*Assistant Examiner*—J. A. Lorengo
*Attorney, Agent, or Firm*—Collard & Roe, PC

[57] ABSTRACT

A process for the production of extruded profiles and shaped sheets, variously decorated, especially from aluminium alloy to be used in the building field, for domestic appliances and the like, comprising the steps of preliminary preparation of the surfaces of the article (1), the application of preliminary painting cycles or other surface treatments, the wrapping of the article with a transfer support (2) carrying the decorations wished, the covering of the part so wrapped within a membrane (5) of rubber or the like and the creation of vacuum through holes (6) between the membrane and the piece covered by the same, on prior interposition of means (3) suitable to ensure the flow and the exhaust of the air so as to cause the adhesion of the support to the shape of the article, as well as the possible interposition of yielding means (4), suitable to equalize the pressure exercised by the membrane and lastly the heating for the transfer of the pattern and the polymerization of the colors.

4 Claims, 2 Drawing Sheets

PROCESS FOR MAKING DECORATED, EXTRUDED, PROFILED ELEMENTS

DESCRIPTION

Figure 1:
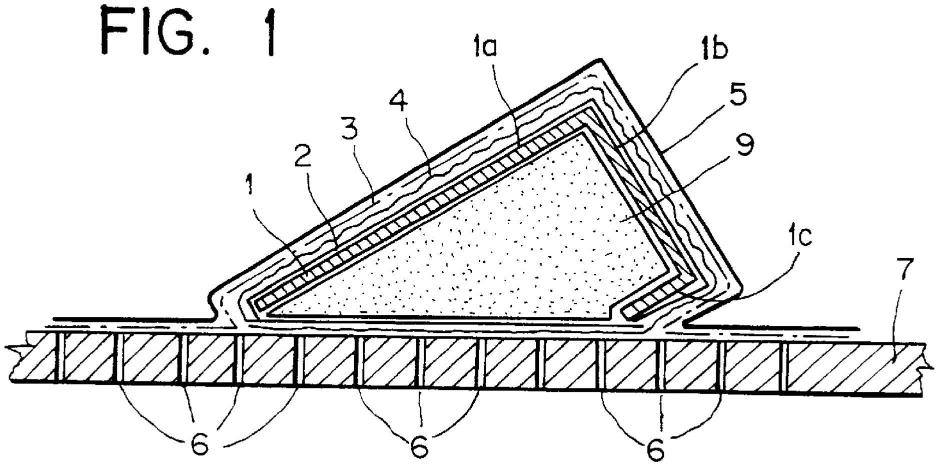

This invention relates to a process and the relevant apparatus for the realization of articles or parts from metal, painted and/or variously decorated, particularly from aluminium alloy, comprising extruded or drawn semifinished products, also of large size, or bent or shaped sheets, even of large size, in particular to be used in building and in the field of the production of domestic appliances, such as refrigerators, washing machines and the like.

More particularly, said process allows to obtain surface finishings which reproduce accurately the aspect of various materials, such as the grains of wood and veins of marble or other patterns, as well as to transfer on the part and/or the surface of the extruded or drawn profiles or the shaped sheets any ornamental pattern, even a complicated one, without deformations or defects of the same pattern.

This invention also, relates to an apparatus which allows to realize said decorated articles.

As is known, the processes of the known art for the realization of the decoration on metals involves realization difficulties and complexities due to the fact that they require more or less automatized installations which operate on the flat surface of strips or sheets.

Besides, other processes and apparatuses are known for the realization of one-colour painting of metal articles, for instance parts or profiles from aluminium alloy, which consist, for instance, in electro-colouring processes, very complicated and expensive, or processes based on the technique of the transfer of a multi-colour pattern from a support carrying the pattern to a flat surface, from metal or fabric or other materials, by a contemporaneous action of pressure and temperature, carried out sometimes continuously by means of heated calenders.

Processes and associated apparatuses are also known which allow the realization of multi-colour and complicated decorations on articles of various type and having also a surface other than flat by the technique of the transfer of a pattern from a flexible support to the whole surface of the article by ink sublimation. As is known, such technique consists in wrapping the article with a support comprising the sublimable decoration, usually from paper, in introducing the article wrapped in the paper support into a container made up by two elastically deformable membranes fixed to two substantially rectangular frames hinged to one another, in making the vacuum in said container so that the flexible membranes adhere to the article, crushing the support against the surface of the articles. The pressure and the heat may be obtained also in an oil bath oven. In this case, the article to be decorated, suitably wrapped by the decoration transfer support, is introduced in the oil bath oven, protected by an envelope or bag from elastically deformable, high temperature resistant material.

Processes of this type and the associated apparatuses, such as for instance the one described in FR 2203321 (VILLEROY), EP 544603 (CLAVEAU), EP 451067 (CLAVEAU) and EP 606189 (CLAVEAU), allow however to realize multi-colour or anyhow complicated decorations only on small size articles, such as for instance cans, canisters, china articles and the like, but not on large size articles, such as extruded profiles of a length up to 20 meters, bent or shaped sheets and the like.

Therefore, object of this invention is to provide a process and the associated apparatus for the realization of open or closed section profiles from aluminium alloy or other metals, of large size, for instance extruded pieces having a length up to about 20 meters and rigid bent and shaped sheets, so decorated as to carefully reproduce the aesthetic effect of the various materials, such as wood, marble or the like, or anyhow showing throughout the surface or part of the same any ornamental pattern (floral, geometrical or other ones), however complicated and elaborated.

A further object of this invention is to provide extruded profiles for building, shaped sheets for domestic appliances, etc. variously decorated on the surfaces which remain on sight, even with complicated patterns, substantially free from defects, disuniformities of the pattern and the like.

Another object of the invention is to provide a process comprising particularly simple and highly reliable working steps, as well as the associated apparatus, such as to lead to finished articles suitable to be widely used in many and different sectors, particularly in building and in the field of furniture, in the field of domestic appliances and the like.

These and still other objects, which will appear more clearly from the following description, are reached by a process for the realization of large size articles such as extruded or drawn semifinished products, bent and shaped sheets and the like, having also indentations, recesses and grooves, painted and/or variously decorated, particularly from aluminium alloy, utilizing the technique of the transfer of one-colour or multi-colour patterns or figures, reproduced on a paper transfer support or the like, by a combined action of pressure and temperature, which process comprises, according to this invention, the following steps:

submitting the raw article to be decorated, consisting of profiles of a length up to 20 meters or of bent or shaped sheets, to usual operations of surface preparation, such as cleaning, degreasing, chemical and/or electrolytic conversion, then submitting it to one or more preliminary painting cycles, realizable with fluid or powder paints, carrying out a first operation with paints of a prefixed colour and such as to constitute a primer coat, and a possible subsequent operation with transparent paints to avoid phenomena of diffusion with the colours of the transfer support, or, in the case of aluminium and its alloys, submitting it to anodization, either colourless or coloured, then after the hardening of said paints by polymerization under said painting cycles or at the end of said anodization, carrying out the wrapping of the article or the covering of the surfaces of the article to be decorated, with said transfer support, and then covering the article already wrapped in said support with a sheath or membrane from elastically yielding impermeable material, such as rubber or the like, flat or so shaped as to substantially adjust to the shape of the article, then creating the vacuum between said article wrapped in said support and said membrane, so as to cause the transfer support to uniformely adhere to the form of the article, and lastly submitting the so treated article to a heating action variable up to about 280° C., for a time ranging from about 30 seconds to 30 minutes, to perform the transfer of the colours from the transfer support to the article and their hardening by polymerization.

More particularly, according to this invention, between said article wrapped in said support and in said sheath or membrane from elastically yielding impermeable material, a means is interposed from flexible, air-permeable material, such as large weft fabric, gauze or the like, suitable to create thin channels between the article wrapped in the support and the impermeable sheath or membrane, allowing in this way the complete and uniform exhaust of air during the stage of vacuum creation, avoiding disuniformities in the adhesion of the sheath to the article, the formation of air bubbles and the like.

In fact, it has been noticed that the interposition of the means from flexible, air-permeable material according to this invention allows to realize articles provided with various and complicated decorations, substantially free from deformations of the pattern, presence of non decorated zones or zones with poorly engraved decorations, also when the article is of large size, such as for instance an extruded profile of a length up to 20 meters, a shaped and bent sheet, such as the door of a refrigerator, etc.

Always according to this invention, between said article wrapped in said support and said elastically yielding membrane, a means is interposed from flexible permanently yielding material, such as crepe paper or the like, suitable to unify and equalize the pressure exercized by said membrane on the surfaces of the article under the action of the vacuum. In fact, it has been noticed that the interposition of said permanently yielding means, such as crepe paper or the like, allows to realize substantially without deformations, twists, fadings or the like, any pattern and decoration, however complicated and/or with nuances, contrasts, etc., even on the most difficult points of the surface of the article, such as those in correspondence of the edges. Besides, always according to this invention, to ensure the adhesion of the inked support to the article to be decorated and/or to prevent deformations of the open profile articles, counter-mouldings or pads are applied within said indentations or recesses, between said transfer support and said membrane before creating the vacuum, if one wishes to decorate also the internal surface of said indentations, or directly in touch with the surface of said recesses, if one does not wish to decorate the internal surface of said recesses, as for instance in the case of the internal surface of a bent sheet to be used for a refrigerator door, in which case, as is obvious, it is useless to decorate the internal face of the sheet, as the latter will be entirely covered by insulating material and the counter-door. In the above case, the counter-moulding is utilized for the purpose of countering the stresses ensuing from the creation of vacuum, preventing in this way deformations in the parts to be decorated. The counter-moulding or pad may be realized from any rigid or semi-rigid material that can withstant the working temperatures. Materials such as silicone rubber, wood, aluminium, steel, etc., can be advantageously utilized. More particularly, said final heating action is carried out by means of several infrared lamps or said heating is carried out within a tunnel-oven or the like with hot air circulation obtained by any energy source. Besides, said final heating temperature is preferably mantained for a time comprised between 30 seconds and 30 minutes.

The process subject matter of the invention utilizes for the application on profiles inks suitable also for outdoor exposure.

After the suitable and known operations of preparation of the surfaces to be decorated, one or more preliminary painting cycles are performed, which are obtainable with either fluid or powder paints, with the aim of obtaining a coat of primer and a possible transparent layer to prevent phenomena of diffusion with the colours of transfer from the support. Besides, for the practical realization of the process according to this invention, various apparatuses can be used which allow to decorate open or closed section profiles of lengths up to about 20 meters, as well as bent and shaped sheets whose size is fit for constituting parts of furniture, domestic appliances, such as refrigerator doors and the like.

An apparatus for the realization of profiles and variously decorated shaped sheet according to this invention comprises:

a bench of a length up to 20 m, on which the article rests which has to be decorated, suitably pretreated (cleaned, degreased and already treated with one or more preliminary paint coats or submitted to anodization, either coulourless or coloured), and on which said article is prepared by wrapping it with the transfer support, the permeable means and possibly the permanently yielding means;

a table of a length equal to the length of said bench, provided with a plurality of through-holes, on which said wrapped article is transferred and positioned;

a covering means comprising at least a sheath or membrane from elastically yielding impermeable material to be positioned on said wrapped article resting on said table;

a device to create the vacuum between said membrane and said drilled table through said holes, so that said membrane adheres and exerts a pressure on said wrapped article;

heaters located above said drilled table, associated to ventilation and air circulation means, positioned in a special hood.

More particularly, said heaters may advantageously comprise, for instance, a battery of infrared lamps in a room with ventilated air.

Besides, said drilled table may be horizontally translable and/or said hood liftable so as to make easier the access to the zone concerned by the drilled table in case of particularly delicate workings.

The elastically yielding membrane is substantially formed by a blanket from rubber or other elastic and heat-resistant material, which is laid on the wrapped article to be decorated and which adheres to the same thanks to the vacuum created through the holes. The membrane may be entirely free, or, for the sake of convenience, it may be fixed to the table along one of its sides, or along an edge of the hood, etc.

According to a variant of this invention, said covering means may be formed by a horizontally translable base, comprising a first rigid frame to which an elastic or semirigid table is fixed, on which table the wrapped article rests, and an upper elastically yielding envelope fixed to a second frame, liftable or book-like openable above said base, the vacuum creation being obtained between said base and said upper envelope through through-holes obtained in said first or said second frame and connected to said device for the creation of vacuum.

Said covering means may be constituted by a tubular flexible bag of a length slightly longer than the length of the article to be decorated, within which there is wrapped the article covered with the support to be decorated, the vacuum being obtained from the end of said tubular bag by means of the vacuum creation device.

Figure 2:
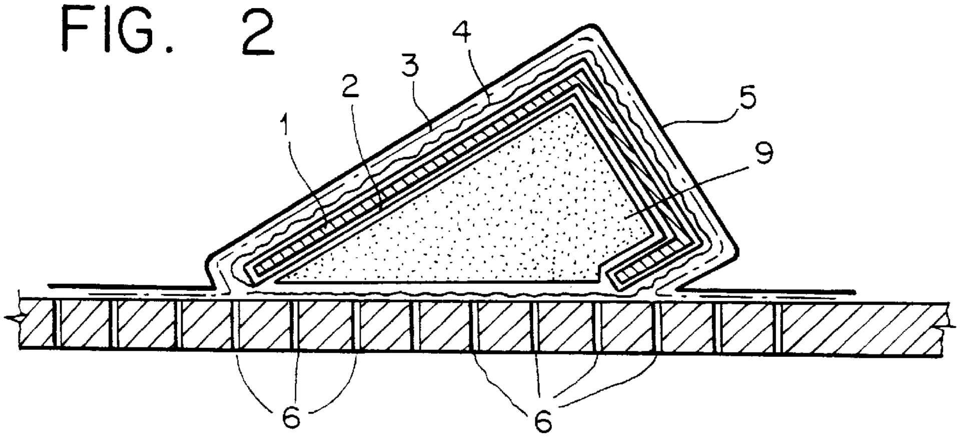
Figure 3:
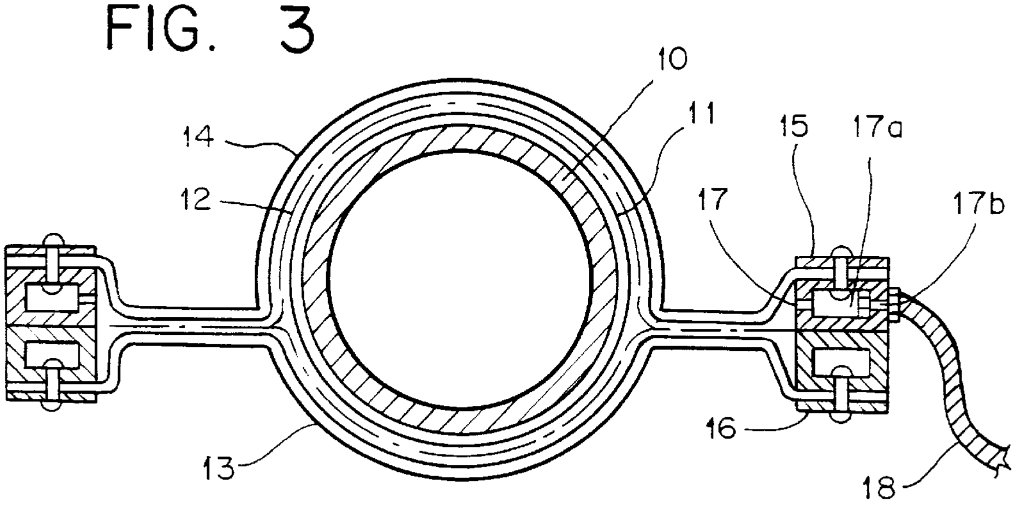
Figure 4:
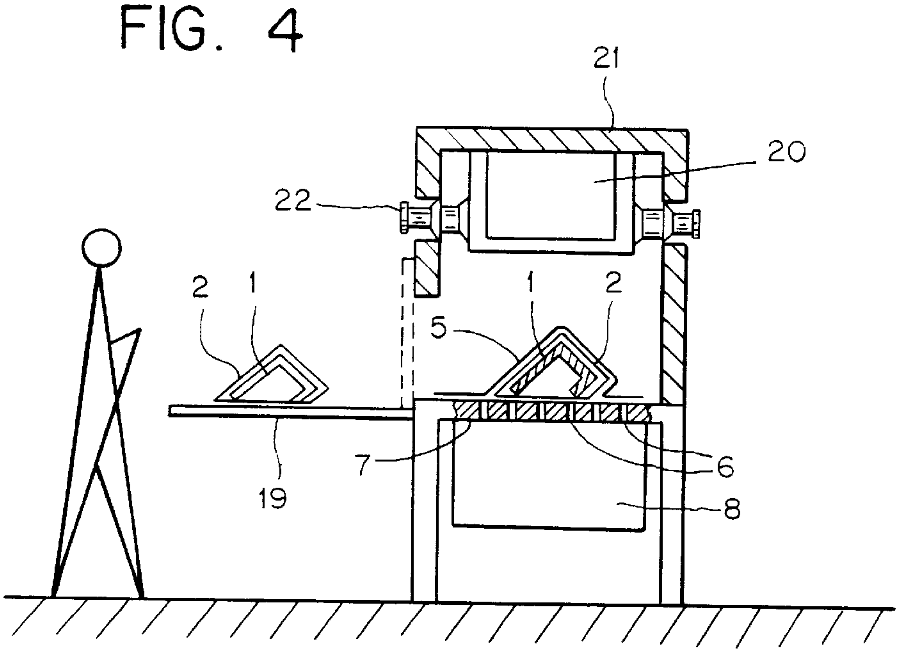
Figure 5:
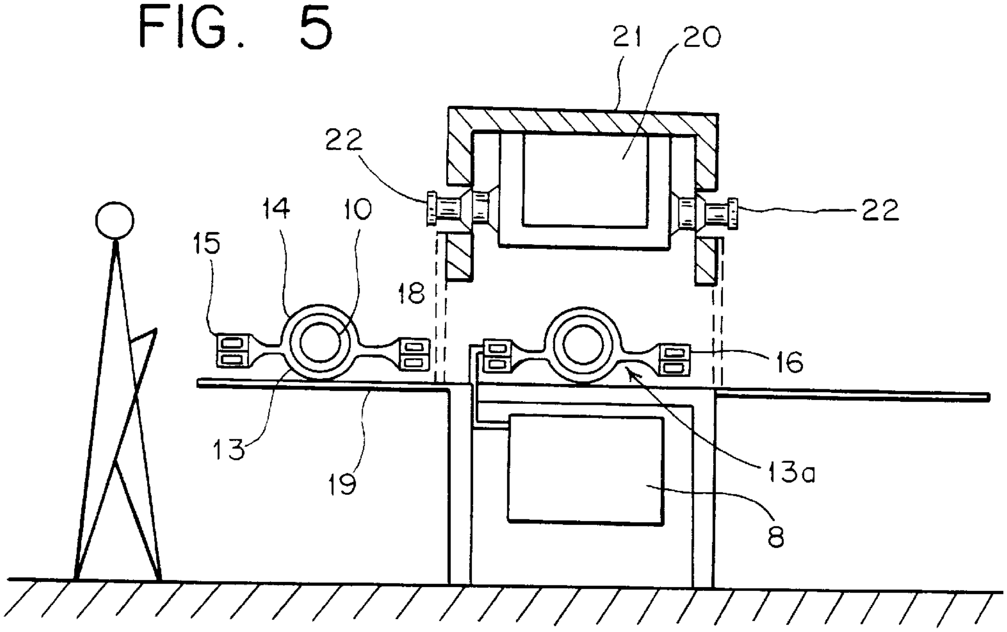

Further characteristics and advantages of this invention will be better stressed by the following detailed description, made with reference to the attached drawings, which have only an indicative and non limitative purpose, wherein:

FIGS. 1 and 2 show schematically the section of an article wrapped in the various preparation means and covered by the elastically yielding membrane, ready to be submitted to the heating action;

FIG. 3. shows schematically the section of another type of covered article resting on the translable base, according to the variant of this invention and ready to be submitted to heating;

FIG. 4 shows schematically the section of an apparatus suitable to carry out the decoration process according to the invention on various articles, such as extruded rods or profiles or shaped sheets of different sizes and of a length up to 20 meters;

FIG. 5, always schematically and in section, shows a variant of the apparatus of FIG. 4.

With reference to FIG. 1, article 1, constituted by a "C"-shaped extruded profile from alumium alloy, to be generically utilized in the building field, is wrapped in the transfer support 2, in the large weft cloth 3 suitable to create the channels for the flow and exhaust of air, and in the permanently yielding means 4, formed by crepe paper, particularly suitable, as said, when one wishes to decorate adjoining edge surfaces, as are in this case surface 1*a*, 1*b* and 1*c*.

The article is then covered with the elastically yielding membrane 5 which adheres perfectly to all the parts of the articles which are to be decorated, thanks to the vacuum created between membrane 5 and table 7 through holes 6 obtained in table 7 and connected to the device for the creation of vacuum 8 A counter-moulding 9 may be inserted in the recess of the hollow profile, wherein the vacuum creation may cause deformations in the piece to be decorated, acting in this case as a reinforcement.

FIG. 2 shows the "C"-shaped profile 1, provided with counter-moulding 9 applied in the recess of the same profile, when one wishes to decorate also its internal faces; in this case, the counter-moulding 9 acts as a pad besides as a reinforcement.

FIG. 3 shows a variant of the invention: the cylindrical extruded profile 10, wrapped in the transfer support 11 and in the large weft cloth 12 is placed on the elastic table 13 fixed to the first hollow frame 16; the upper envelope 14, fixed to the hollow frame 15 covers the profile wrapped in the support and the cloth and adheres to the same support thanks to the vacuum created through holes 17, which, through recess 17*a* of the frame and holes 17*b*, are connected with the device for the creation of vacuum 8, through channels 18. In this way, thanks to recess 17*a* provided in the frame, a perfect uniformity is obtained in the creation of vacuum, which also contributes to prevent defects in the transfer of the decoration, when the article is complicated or long. In the example of FIG. 3, the interposition of crepe paper, i.e. of a permanently yielding means, is not necessary, as the surface of the profile has no edges.

FIG. 4 shows an apparatus suitable to realize the decorated article according to the invention. Such apparatus comprises bench 19 on which article 1 is wrapped in the transfer support, the cloth, etc., the latter being not represented. From bench 19, the wrapped article is transferred to table 7 and covered with the membrane or sheath 5. Then, through device 8, formed by a pump or the like, and through holes 6, the vacuum is created, so that membrane 5 adheres to the wrapped article for its whole length. The heat necessary for the transfer of the decoration from the support to the article is supplied by heaters 20 located above the table, in hood 21. There are also provided means 22, formed by fans or the like, which ensure the circulation of air for the whole length of the hood and uniformly along the whole article. For more use easiness, hood 21 may be liftable and also the table on which the article rests may be horizontally translable.

The apparatus shown in FIG. 5 comprises a semi-rigid base 13 anchored to frame 16, translable in the position 13*a*, of a length greater than the length of the profile or the sheet, and with an upper envelope 14 fixed to a hollow frame 15, liftable or book-like openable, made from a flexible material (rubber or the like) which retracts and perfectly adheres to the pieces on prior creation of the vacuum with the special device 8. This part of the apparatus slides on rails and is placed inside hot-air oven 21, to carry out the transfer of the colours from the support to the article. FIG. 5 indicates the position for the preparation of the pieces and 13*a* shows the working position within the apparatus.

Fans 22 provide to the ventilation and air circulation. Said flexible membrane may be constituted by a flexible tubular bag of a length slightly greater than the length of the article to be decorated, within which there is enclosed the article wrapped in the transfer support, the vacuum being created from the end of said tubular bag by means of device 8, through channel 18.

In practice, it has been noticed that the above described process allows to perfectly transfer the decorations obtained on the support to all the zones, even to the non flat ones, of the profile, which allows to perfectly decorate also profiles having a complicated section and profiles of any size.

What is claimed is:

1. A process for producing a large size metal article (1) including extruded profiles of aluminum alloy of a length up to 20 meters or bent and shaped sheets even provided with indentations, recesses, grooves, which are painted or variously decorated by the transfer of decorations reproduced on a transfer support (2) by means of the combined action of pressure and temperature, said metal article having been preliminarily submitted to operations of surface preparation selected from the group consisting of cleaning, degreasing, chemical conversion and electrolytic conversion, comprising the steps of:

submitting said article (1) to a first painting cycle or to first and second painting cycles, using a paint selected from the group consisting of fluid paint and powder paint, carrying out said first cycle with a paint of a prefixed color to constitute a coating of primer, and said subsequent second cycle with a transparent paint to avoid phenomena of diffusion with the colors of the transfer support; and in the case of aluminum alloys, submitting said article to anodization, either colorless or colored and not to painting cycles;

after hardening of said paints by polymerization during said painting cycles or at the end of said anodization, wrapping the article or covering surfaces of the article to be decorated with said transfer support (2);

covering the article wrapped in said support (2) with a membrane (5) of elastically yielding impermeable material which is so shaped as to substantially adjust to the shape of said article;

interposing between said membrane (5) and the article wrapped in said support a means of air-permeable flexible non-yielding not elastically deformable material, suitable to create thin channels between the article wrapped in the support and said membrane;

applying counter-moulding or pads (9) within said indentations and recesses, between said transfer support (2) and said membrane (5) prior to the vacuum creation, so as to decorate also an internal surface of said recesses; or applying said pads (9) directly in touch with the surface of said recesses, so as not to decorate the internal surface of said recesses;

causing the complete and uniform exhaust of air in a vacuum creation stage, avoiding disuniformities in the adhesion of the membrane to the wrapped article, and avoiding the formation of air bubbles;

creating the vacuum under said membrane (5), so as to cause the transfer support to uniformly adhere to the shape of the article; and submitting the whole to a variable heating action up to about 280° C., for a time ranging from 30 seconds to 30 minutes, to transfer the colors from the transfer support to the article and to harden the colors by polymerization.

2. A process for producing a large size metal article (1) including extruded profiles of aluminum alloy of a length up to 20 meters or bent and shaped sheets even provided with indentations, recesses, grooves, which are painted or variously decorated by the transfer of decorations reproduced on a transfer support (2) by means of the combined action of pressure and temperature, said metal article having been preliminarily submitted to operations of surface preparation selected from the group consisting of cleaning, degreasing, chemical conversion and electolytic conversion, comprising the steps of:

submitting said article (1) to a first painting cycle or to first and to second painting cycles, using a paint selected from the group consisting of a fluid paint and powder paint, carrying our said first cycle with a paint of a prefixed color to constitute a coating of primer, and said subsequent second cycle with a transparent paint to avoid phenomena of diffusion with the colors of the transfer support; and in the case of aluminum alloys, submitting said article to anodization, either colorless or colored and not to painting cycles;

after hardening of said paints by polymerization during said painting cycles or at the end of said anodization, wrapping the article or covering surfaces of the article to be decorated with said transfer support (2);

covering the article wrapped in said support (2) with a membrane (5) of elastically yielding impermeable material which is so shaped as to substantially adjust to the share of said article;

interposing between said membrane and the article wrapped in said support a means of flexible permanently yielding material comprising crepe paper, suitable to unify and equalize pressure exercised by said membrane (5) on the surfaces of the article under an action of vacuum;

applying counter-moulding or pads (9) within said indentations and recesses, between said transfer support (2) and said membrane (5) prior to the vacuum creation, so as to decorate also the internal surface of said recesses; or applying said pads (9) directly in touch with the surface of said recesses, so as not to decorate the internal surface of said recesses;

creating the vacuum under said membrane (5), so as to cause the transfer support to uniformly adhere to the shape of the article (1); and submitting the whole to a variable heating action up to about 280° C., for a time ranging from 30 seconds to 30 minutes, to transfer the colors from the transfer support to the article and to harden the colors by polymerization.

3. A process for producing a large size metal article (1) including extruded profiles of aluminum alloy of a length up to 20 meters or bent and shaped sheets even provided with indentations, recesses, grooves, which are painted or variously decorated by the transfer of decorations reproduced on a transfer support (2) by means of the combined action or pressure and temperature, said metal article having been preliminarily submitted to operations of surface preparation selected from the group consisting of cleaning, degreasing, chemical conversion and electolytic conversion, comprising the steps of:

submitting said article (1) to a first painting cycle or to first and to second painting cycles, using a paint selected from the group consisting of fluid paint and powder paint, carrying out said first cycle with a paint of a prefixed color to constitute a coating of primer, sand said subsequent second cycle with a transparent paint to avoid phenomena of diffusion with the colors of the transfer support; and in the case of aluminum alloys, submitting said article to anodization, either colorless or colored and not to painting cycles;

after hardening of said paints by polymerization during said painting cycles or at the end of said anodization, wrapping the article or covering surfaces of the article to be decorated with said transfer support (2);

covering the article wrapped in said support (2) with a membrane (5) of elastically yielding impermeable material which is so shaped as to substantially adjust to the shape of said article;

interposing between said membrane (5) and the article wrapped in said support a means of air-permeable flexible non-yielding not elastically deformable material, suitable to create thin channels between the article wrapped in the support and said membrane;

causing the complete and uniform exhaust of air in a vacuum creation stage, avoiding disuniformities in the adhesion of the membrane to the wrapped article, and avoiding the formation of air bubbles;

interposing between said membrane and the article wrapped in said support a further means of flexible permanently yielding material comprising crepe paper;

apply counter-moulding or pads (9) within said indentations and recesses, between said transfer support (2) and said membrane (5) prior to the vacuum creation, so as to decorate also the internal surface of said recesses; or applying said pads (9) directly in touch with the surface of said recesses, so as not to decorate the internal surface of said recesses;

creating the vacuum under said membrane (5), so as to cause the transfer support to uniformly adhere to the shape of the article (1); and submitting the whole to a variable heating action up to about 280° C., for a time ranging from 30 seconds to 30 minutes, to transfer the colors from the transfer support to the article and to harden the colors by polymerization.

4. An apparatus for the decoration of a large size metal article (1) comprising a bench (19) on which an article (1) rests which is to be decorated, pretreated and on which said article is prepared by wrapping it with the transfer support;

a table (7) of a length equal to the length of said bench (19), on which said wrapped article is transferred and positioned;

a covering means of elastically yielding impermeable material;

a device (8) to create the vacuum;

heaters (20) located above said table (7) connected to ventilation and air circulation means (22), positioned in a hood (21);

said table (7) is provided with a plurality of drilled through holes (6) and that said covering impermeable means is comprised by a membrane (5) to be positioned over said wrapped article resting entirely freely on drilled table (7);

the vacuum being created between said membrane (5) and said table (7) through said holes (6), so that said membrane adheres and exerts a pressure on said wrapped article; and said drilled table (7) being horizontally translatable to and from said heaters and said hood.

* * * * *